(12) United States Patent
Hsu et al.

(10) Patent No.: US 10,414,593 B2
(45) Date of Patent: Sep. 17, 2019

(54) TRANSPORT APPARATUS FOR CONVEYING SHOE VAMP

(71) Applicant: Pou Chen Corporation, Chang Hwa Hsien (TW)

(72) Inventors: Chien-Yu Hsu, Chang Hwa Hsien (TW); Yu-Fong Yang, Chang Hwa Hsien (TW); Yao-Hsin Wang, Chang Hwa Hsien (TW); Chih-Lung Chen, Chang Hwa Hsien (TW)

(73) Assignee: POU CHEN CORPORATION, Chang Hwa Hsien (TW)

( * ) Notice: Subject to any disclaimer, the term of this patent is extended or adjusted under 35 U.S.C. 154(b) by 0 days.

(21) Appl. No.: 16/140,723

(22) Filed: Sep. 25, 2018

(65) Prior Publication Data

US 2019/0152709 A1 May 23, 2019

(30) Foreign Application Priority Data

Nov. 23, 2017 (TW) .............................. 106140667 A

(51) Int. Cl.
  *B65G 17/32* (2006.01)
  *B65G 13/04* (2006.01)
  *A43D 11/00* (2006.01)

(52) U.S. Cl.
  CPC ............ *B65G 17/323* (2013.01); *A43D 11/00* (2013.01); *B65G 13/04* (2013.01); *B65G 2201/0214* (2013.01); *B65G 2201/0229* (2013.01); *B65G 2812/99* (2013.01)

(58) Field of Classification Search
  CPC ............ B65G 13/04; B65G 2201/0214; B65G 35/063; B65G 2201/0229; B65G 2812/99; B65G 17/32; A43D 11/145; A43D 11/003; B25B 5/04; B25B 5/061
  USPC ............................................ 198/468.9, 474.1
  See application file for complete search history.

(56) References Cited

U.S. PATENT DOCUMENTS

| 2,443,877 | A | * | 6/1948 | Vacin | ................... | A43D 111/00 |
| | | | | | | 12/1 A |
| 2,891,264 | A | * | 6/1959 | Paulsen | .................. | A43D 8/003 |
| | | | | | | 12/1 R |
| 3,127,004 | A | * | 3/1964 | Richter et al. | ....... | A43D 117/00 |
| | | | | | | 198/813 |
| 3,538,526 | A | * | 11/1970 | Hadac | .................. | A43D 111/00 |
| | | | | | | 12/1 A |
| 3,760,445 | A | * | 9/1973 | Stapleton | ............. | A43D 11/145 |
| | | | | | | 12/142 R |
| 4,553,341 | A | * | 11/1985 | Hanson | ................ | A43D 111/00 |
| | | | | | | 12/1 A |

(Continued)

*Primary Examiner* — James R Bidwell
(74) *Attorney, Agent, or Firm* — Hamre, Schumann, Mueller & Larson, P.C.

(57) ABSTRACT

A transport apparatus is for conveying a shoe last along a conveying direction, and includes a rail unit, a transport device and a transfer device. The rail unit is divided into process, bridge and transfer regions. The transport device is movably mounted to the rail unit, is movable in the process and bridge regions, and includes a gripper for gripping the shoe last. The transfer device is movably mounted to the rail unit, is movable in the bridge and transfer regions, and includes a holding member for holding the shoe last. When the gripper is in the bridge region, the holding member is operable to hold the shoe last and transfer the shoe last from the gripper to the transfer region.

10 Claims, 13 Drawing Sheets

(56) References Cited

U.S. PATENT DOCUMENTS

2006/0123567 A1* 6/2006 Morlacchi .............. A43B 7/125
                                                    12/142 R
2019/0152022 A1* 5/2019 Hsu ......................... B25B 5/04

* cited by examiner

TRANSPORT APPARATUS FOR CONVEYING SHOE VAMP

CROSS-REFERENCE TO RELATED APPLICATION

This application claims priority of Taiwanese Invention Patent Application No. 106140667, filed on Nov. 23, 2017.

FIELD

The disclosure relates to a transport apparatus, and more particularly to a transport apparatus for conveying shoe vamp.

BACKGROUND

Referring to FIGS. 1 and 2, a conventional transport apparatus 1 is adapted for conveying a shoe last 10 mounted with a shoe vamp 101. The conventional transport apparatus 1 includes a looped track 11 and a plurality of carriers 12. Each of the carriers 12 is mounted to the looped track 11, and is operable to move on the looped track 11. Each of the carriers 12 includes a bracket 121 adapted to be mounted with the shoe last 10, and a carrier plate 122 located below the bracket 121. A plurality of processing devices 102 may be provided along the looped track 11 for performing adhesive applying, adhesive spraying, baking, etc. The shoe vamp 101 will be completely processed by the processing devices 102 after travelling around the looped track 11. Extra processing devices 102 may be required for performing more complicated process steps. The fixed length of the looped track 11 may limit the addition of extra processing devices 102.

SUMMARY

Therefore, an object of the disclosure is to provide a molding device that can alleviate the drawback of the prior art.

According to an aspect of the present disclosure, a transport apparatus is adapted to convey a shoe last mounted with a shoe vamp along a conveying direction.

The transport apparatus includes a rail unit, a transport device and a transfer device. The rail unit is divided into a process region, a bridge region and a transfer region along the conveying direction. The transport device is movably mounted to the rail unit and is movable in the process region and the bridge region. The transport device includes a gripper that is adapted for gripping the shoe last. The transfer device is movably mounted to the rail unit, and is movable in the bridge region and the transfer region. The transfer device includes a holding member that is adapted for holding the shoe last. When the gripper of the transport device is in the bridge region, the holding member of the transfer device is operable to hold the shoe last and transfer the shoe last from the gripper to the transfer region.

BRIEF DESCRIPTION OF THE DRAWINGS

Other features and advantages of the disclosure will become apparent in the following detailed description of the embodiment and variation with reference to the accompanying drawings, of which.

DETAILED DESCRIPTION

Figure 1:
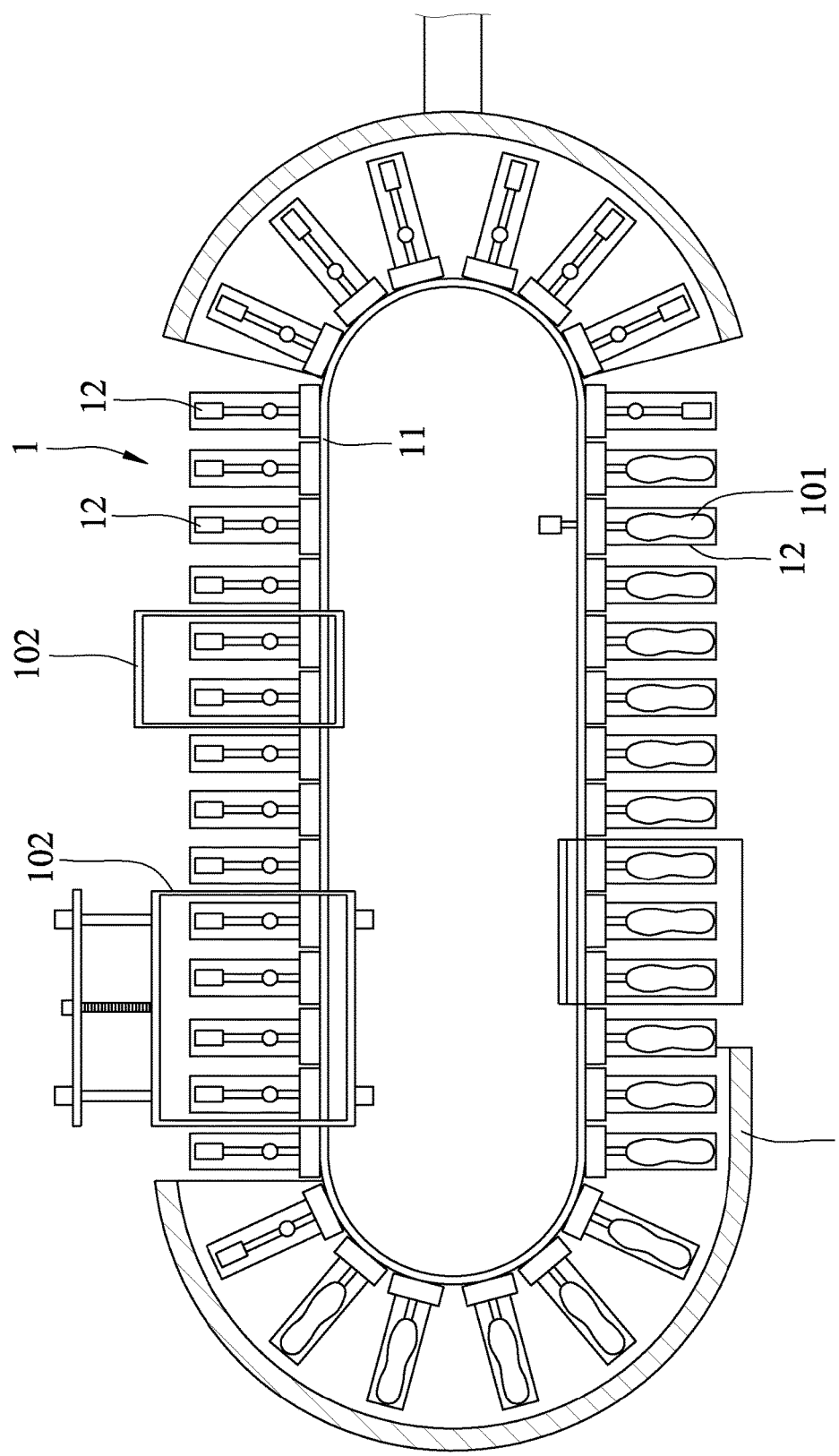
FIG. 1 is a schematic top view of a conventional transport apparatus.
Figure 2:
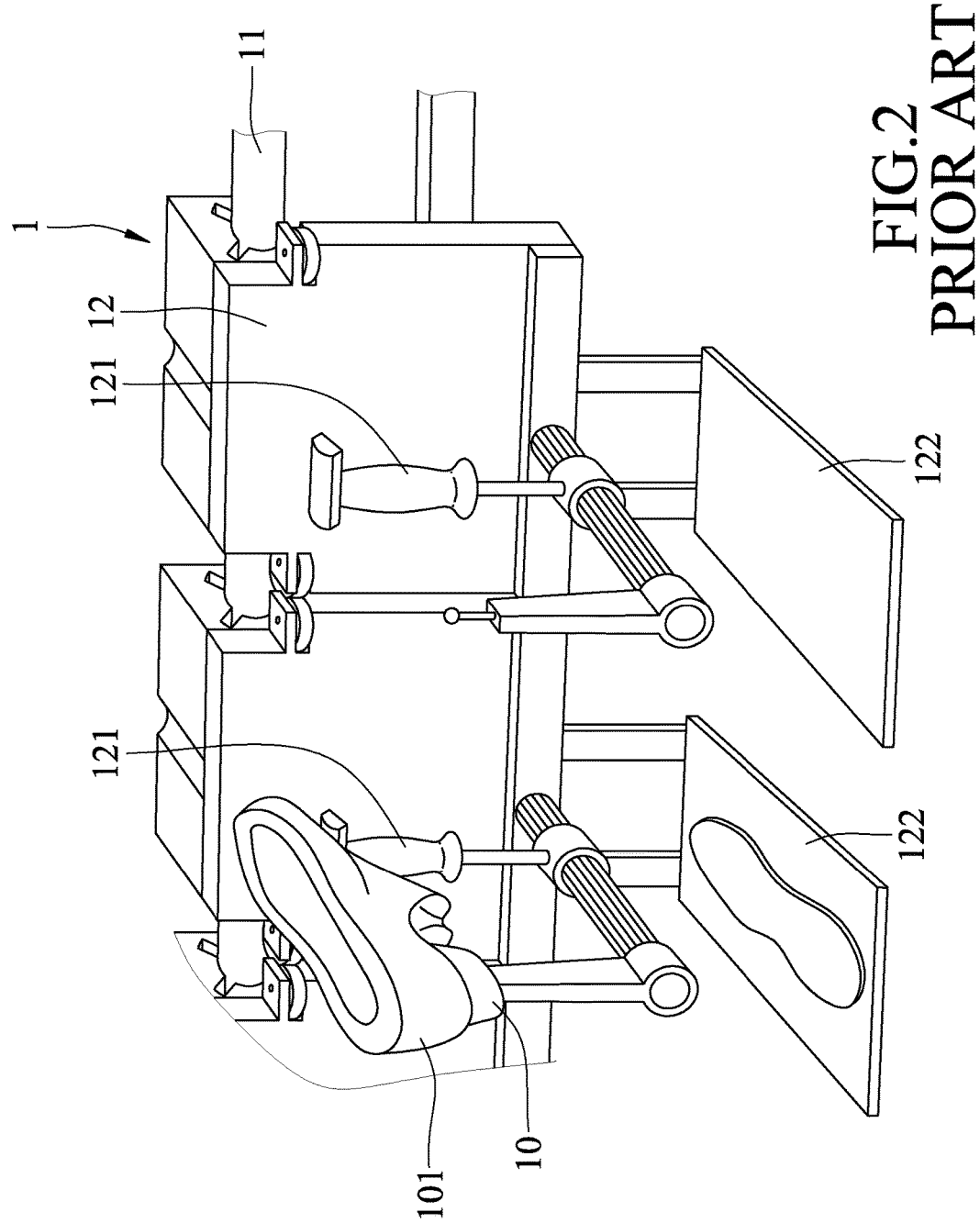
FIG. 2 is a fragmentary perspective view of the conventional transport apparatus.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
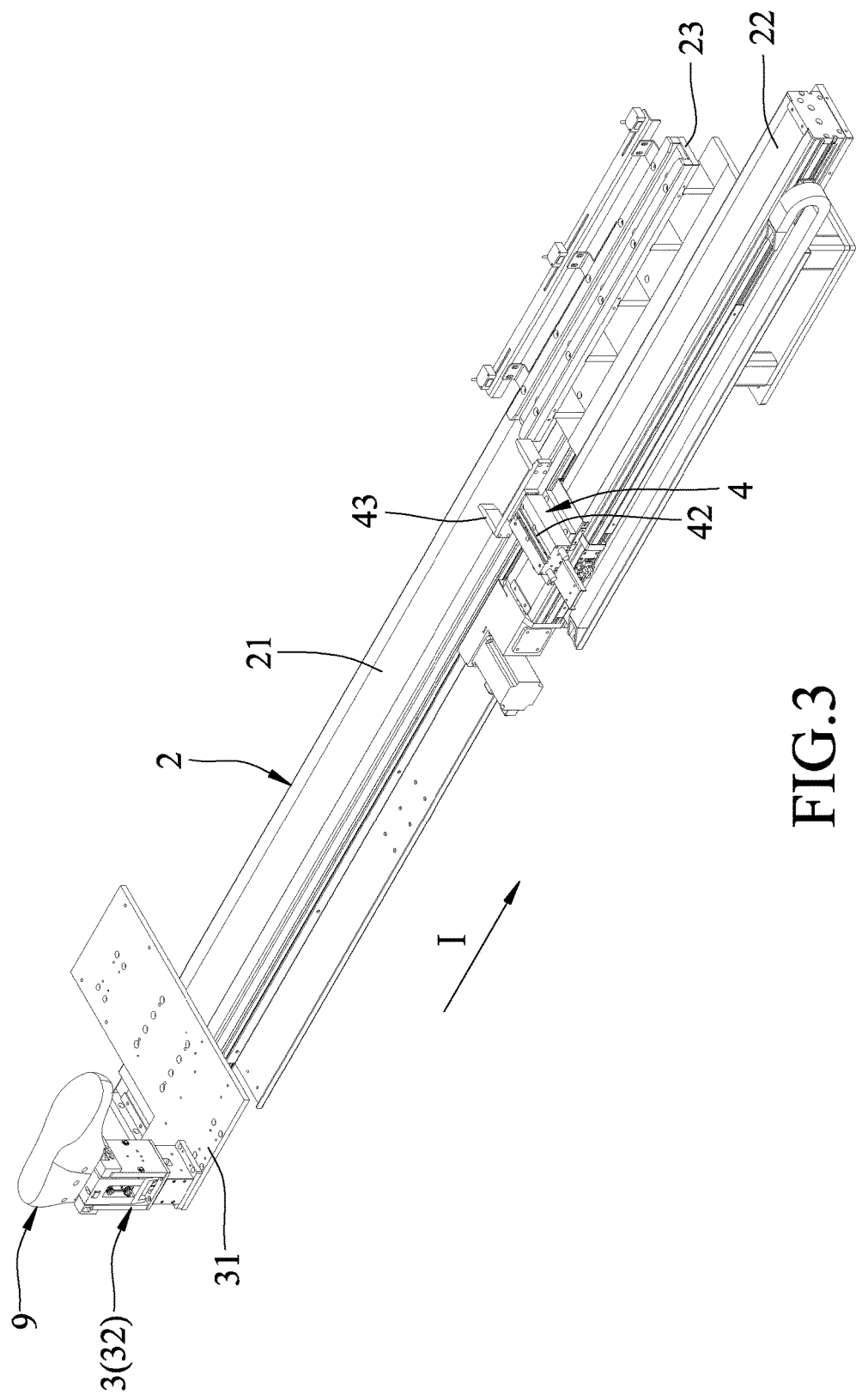
FIG. 3 is a perspective view of an embodiment of a transport apparatus according to the present disclosure.
Figure 4:
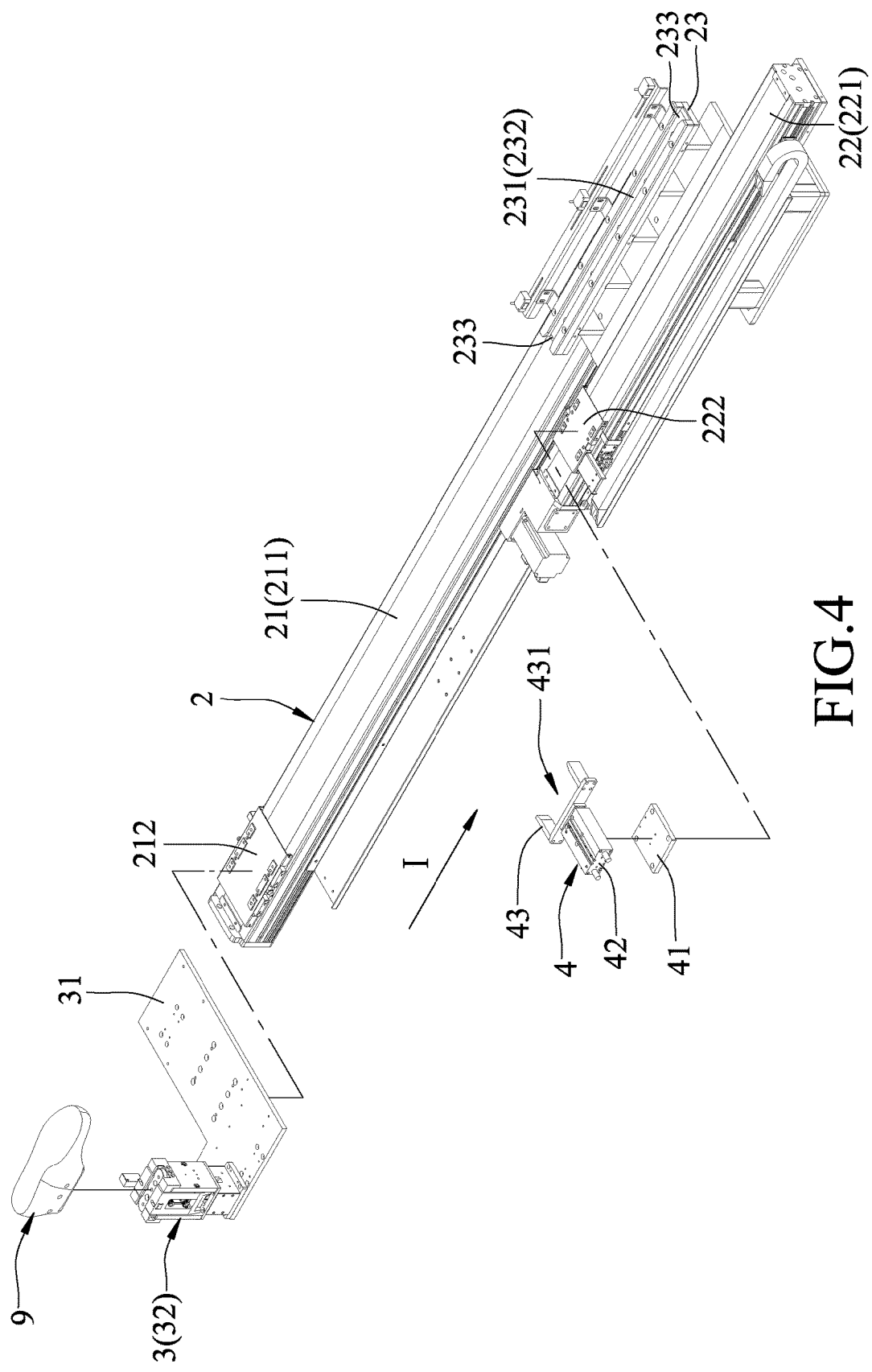
FIG. 4 is a partly exploded perspective view of the embodiment.
Figure 5:
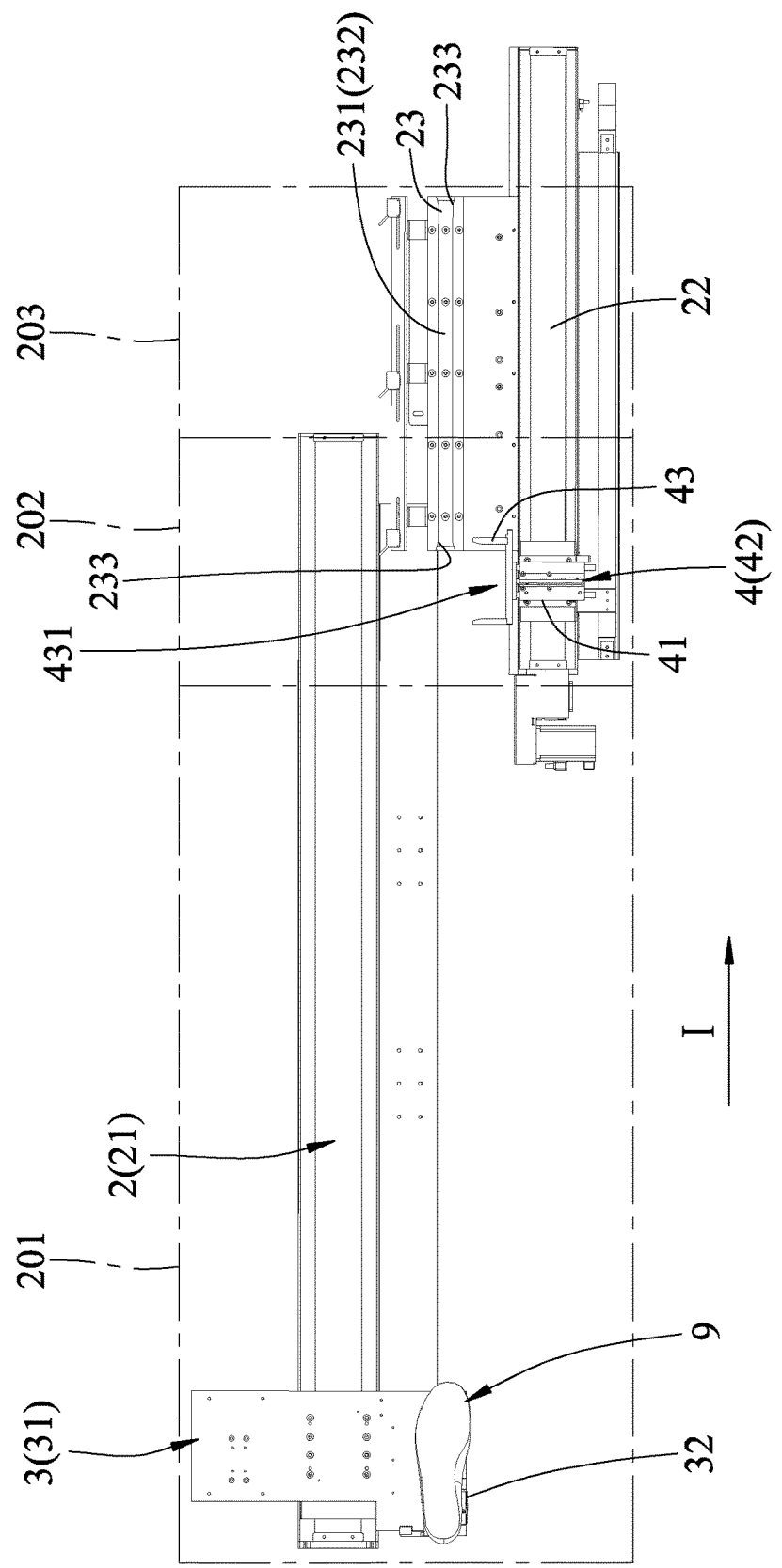
FIG. 5 is a schematic top view of the embodiment, showing a transport device of the embodiment to be in a process region of a rail unit of the embodiment.

Referring to FIGS. 3 to 5, an embodiment of a transport apparatus according to the present disclosure is adapted to convey a shoe last 9 mounted with a shoe vamp (not shown) along a conveying direction (I). The transport apparatus includes a rail unit 2, a transport device 3 and a transfer device 4.

The rail unit 2 is divided into a process region 201, a bridge region 202 and a transfer region 203 along the conveying direction (I). The rail unit 2 includes a first rail assembly 21 that extends from the process region 201 to the bridge region 202 along the conveying direction (I), a second rail assembly 22 that extends from the bridge region 202 to the transfer region 203 along the conveying direction (I) and that is spaced apart from the first rail assembly 21, and a guiding rail 23 that extends from the bridge region 202 to the transfer region 203 along the conveying direction (I) and that is disposed between the first and second rail assemblies 21, 22.

The first rail assembly 21 includes a first rail 211 that extends along the conveying direction (I), and a first moving seat 212 that is movable on the first rail 211 along the conveying direction (I). The first rail assembly 21 is one of a rodless pneumatic cylinder, a conveyer and a linear slide track. In this embodiment, the first rail assembly 21 is the linear slide track.

The second rail assembly 22 includes a second rail 221 that extends along the conveying direction (I), and a second moving seat 222 that is movable on the second rail 221 along the conveying direction (I). The second rail assembly 22 is one of a rodless pneumatic cylinder, a conveyer and a linear slide track. In this embodiment, the second rail assembly 22 is the linear slide track.

The guiding rail 23 has a guiding groove 231 that extends along the conveying direction (I) and that is located in the movement path of the shoe last 9. The guiding groove 231 of the guiding rail 23 is adapted for the shoe last 9 to slide therethrough, and has an elongated uniform-width intermediate groove portion 232 and two diverging groove end portions 233 that are spatially communicated with the elongated uniform-width intermediate groove portion 232. Each of the diverging groove end portions 233 has a width that gradually increases in a direction away from the elongated uniform-width intermediate groove portion 232 for facilitating the entry of the shoe last 9 into the elongated uniform-width intermediate groove portion 232.

The transport device 3 is movably mounted to the rail unit 2, and is movable in the process region 201 and the bridge region 202. The transport device 3 includes a carrier seat 31 that is mounted to the first moving seat 212, and a gripper 32 that is mounted to the carrier seat 31 and that is adapted for gripping the shoe last 9.

Figure 6:
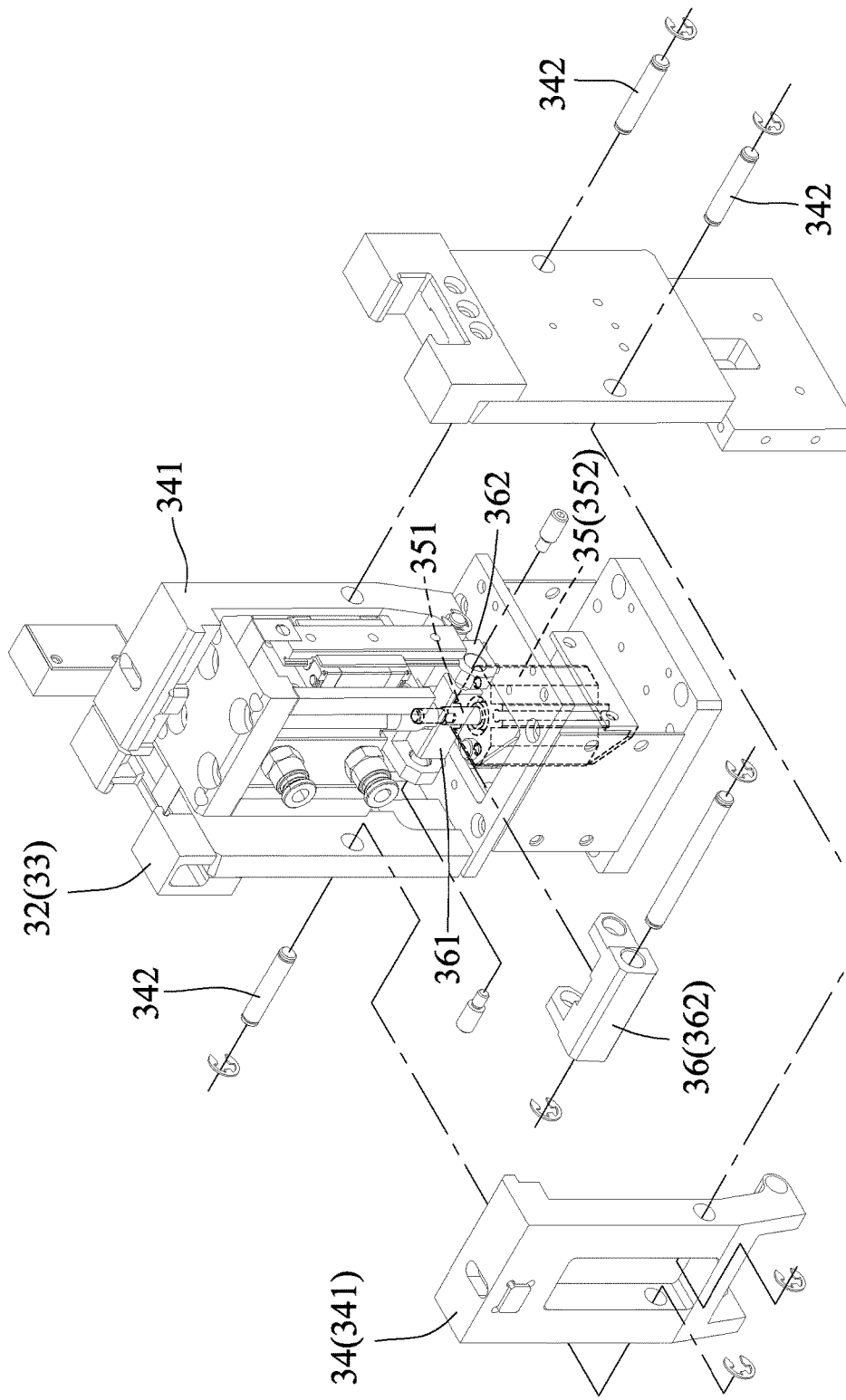
FIG. 6 is a partly exploded perspective view of a gripper of the transport device of the embodiment.
Figure 7:
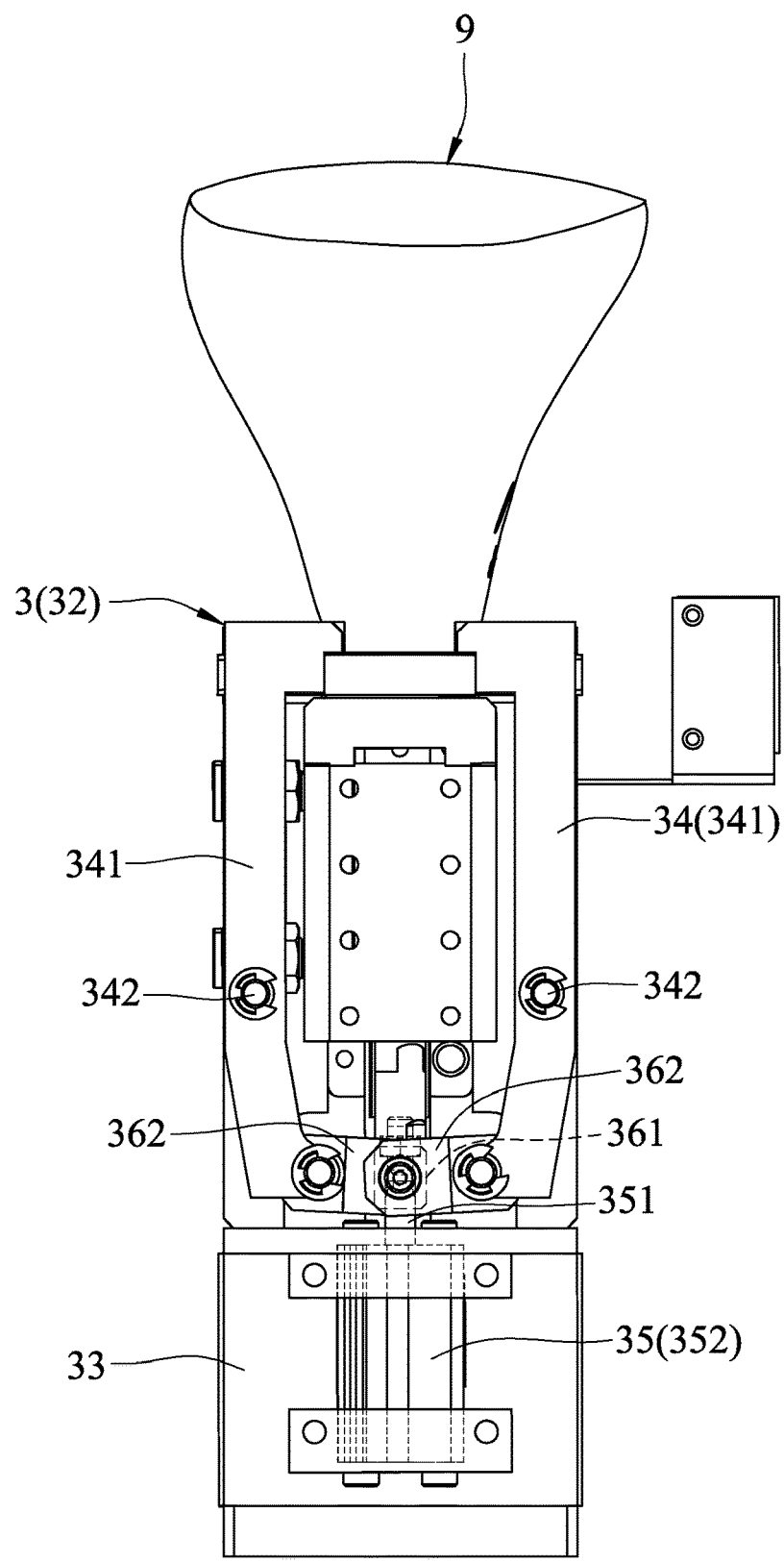
FIG. 7 is a front view of the gripper, which is in a closed state.
Figure 8:
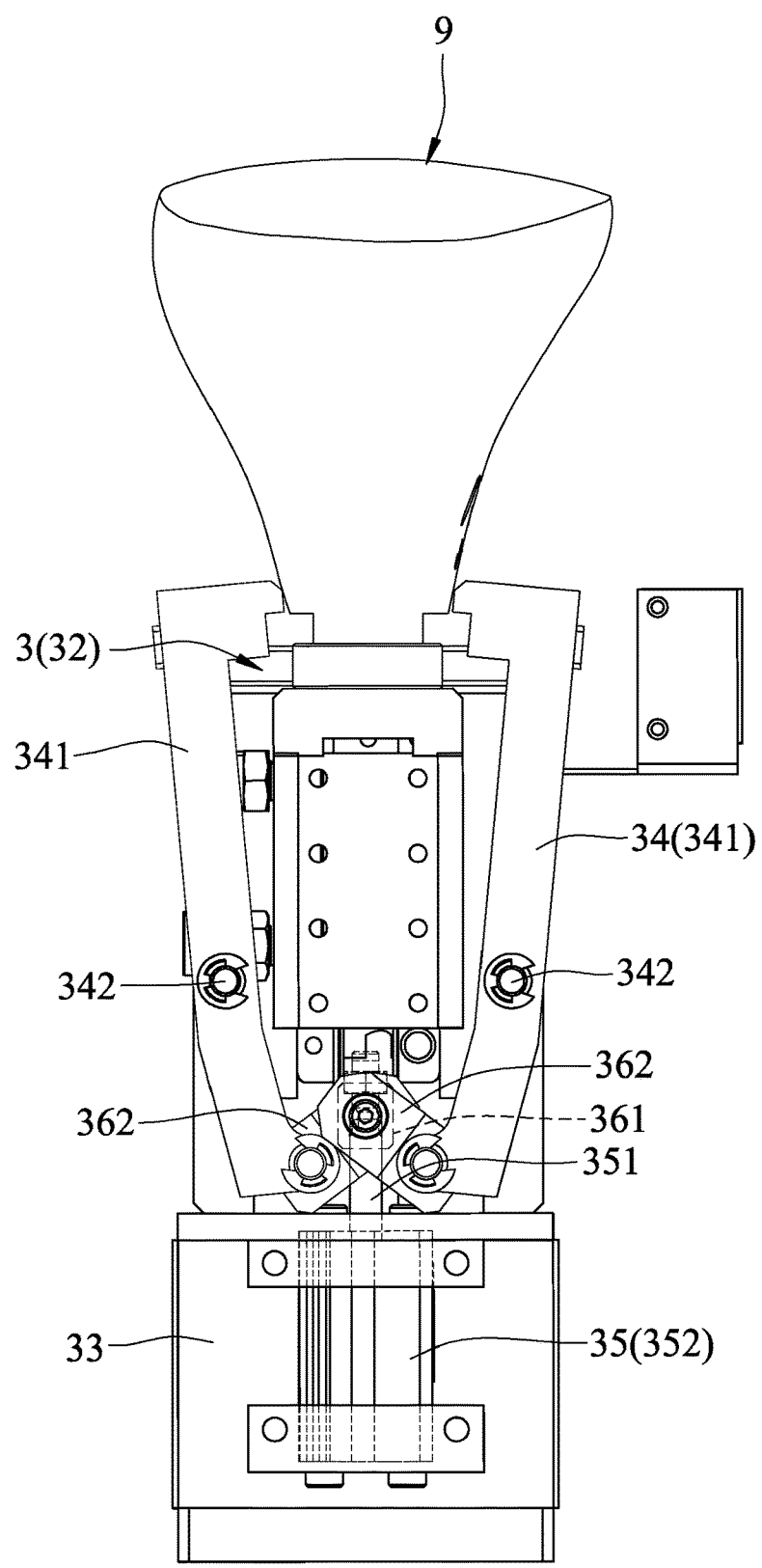
FIG. 8 is a front view of the gripper, which is in an open state.

Referring to FIGS. 4, 6 and 7, the gripper 32 includes an outer shell 33, a gripping claw 34, a driving unit 35 and a connecting unit 36 that connects the gripping claw 34 to the driving unit 35. The gripping claw 34 includes two claw bodies 341 that are pivotally connected to the outer shell 33 by two axial shafts 342. The driving unit 35 is mounted to a bottom side of the outer shell 33, and includes a substantially vertical rod 351 and a lifter 352 that drives the vertical rod 351 to reciprocate vertically. The connecting unit 36 includes a horizontal rod 361 that is connected to the vertical rod 351 of the driving unit 35, and two connecting members 362. The horizontal rod 361 extends in a direction that is substantially perpendicular to the vertical rod 351. Each of the connecting members 362 is pivotally connected to the horizontal rod 361 and a respective one of the claw bodies 341. Referring to FIGS. 7 and 8, when the vertical rod 351 is operated by the lifter 352 to move upwardly, the horizontal rod 361 co-moves upwardly and the claw bodies 341 are pivoted through the axial shafts 342 and the connecting members 362, such that top ends of the claw bodies 341 are moved away from each other and the gripping claw 34 is opened for receiving the shoe last 9 (see FIG. 8). Afterwards, the vertical rod 351 is operated by the lifter 352 to move downwardly to co-move the horizontal rod 361 downwardly such that the claw bodies 341 are pivoted through the axial shafts 342 and the connecting members 362, wherein the top ends of the claw bodies 341 are moved toward each other to grip the shoe last 9 (see FIG. 7). The driving unit 35 may be single-acting piston cylinder, single-rod double-acting cylinder, etc.

Referring to FIGS. 4 and 5, the transfer device 4 is movably mounted to the rail unit 2, and is movable in the bridge region 202 and the transfer region 203. The transfer device 4 includes a carrier board 41 that is mounted to the second moving seat 222 of the second rail assembly 22, an actuator 42 that is mounted to the carrier board 41, and a holding member 43 that is connected to the actuator 42 and that is adapted for holding the shoe last 9. The actuator 42 is operable to drive the holding member 43 to hold the shoe last 9.

Figure 9:
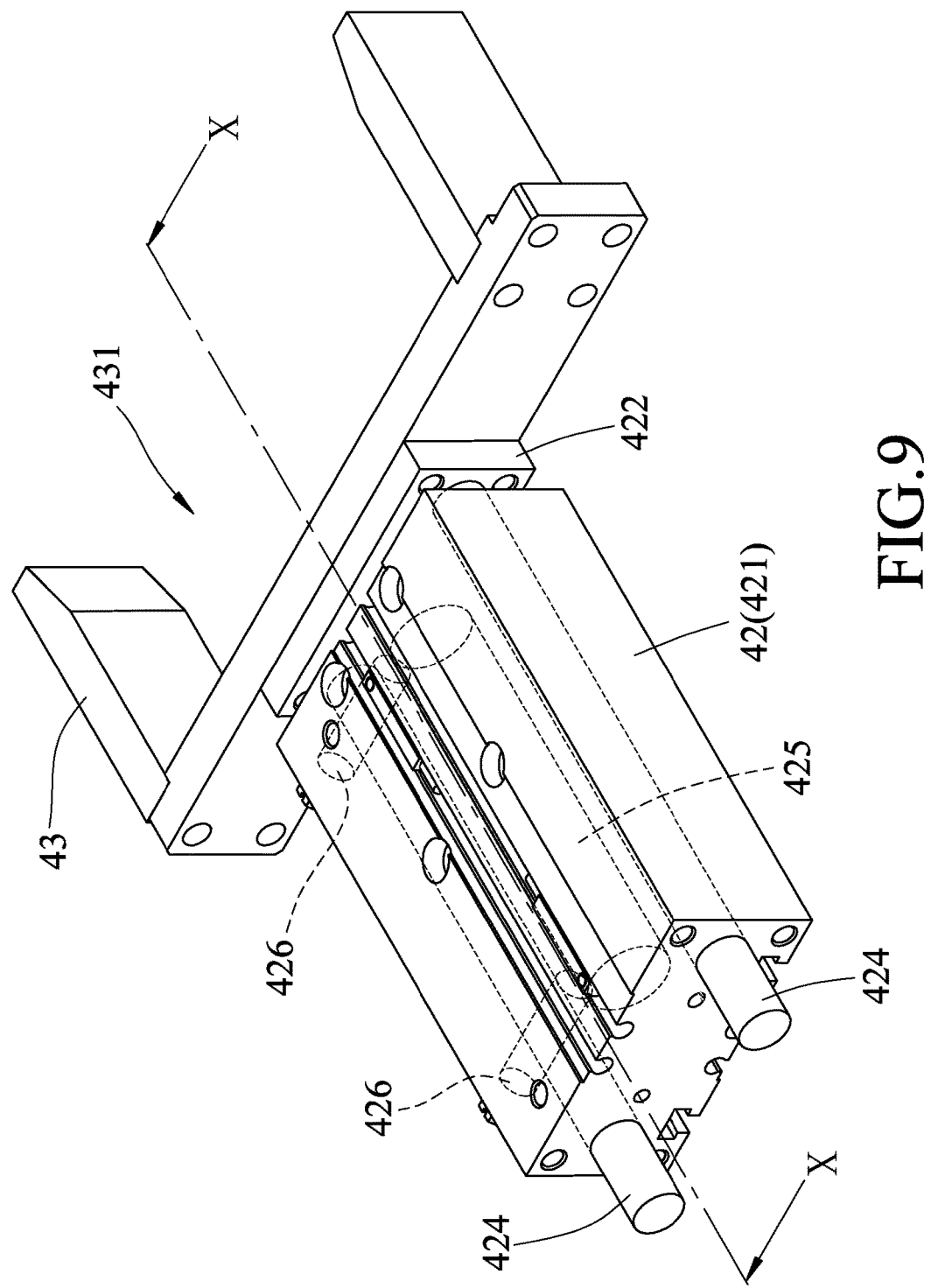
FIG. 9 is a schematic view of an actuator and a holding member of a transfer device of the embodiment.
Figure 10:
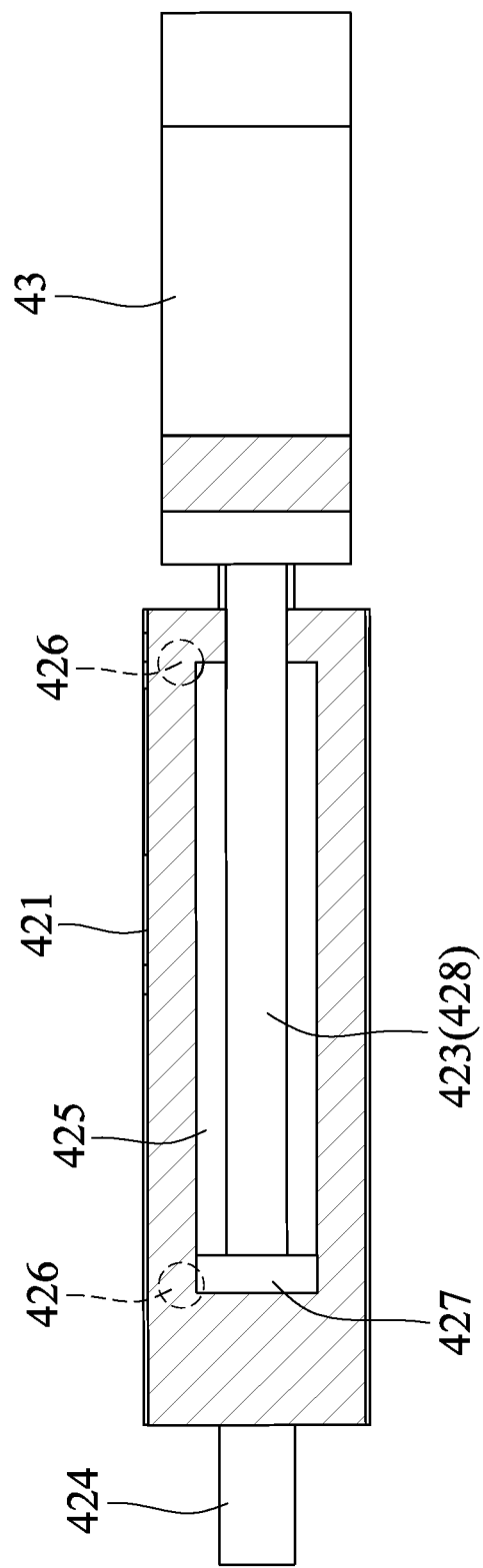
FIG. 10 is a sectional view of the embodiment, taken along line X-X of FIG. 9.

Referring to FIGS. 5, 9 and 10, the holding member 43 has a holding opening 431 that corresponds in shape to the shoe last 9. The actuator 42 includes a cylinder 421, a connecting plate 422, a piston unit 423 and two guiding rods 424. The cylinder 421 includes a chamber 425 and two passages 426 that are respectively located at two ends of the chamber 425. The connecting plate 422 is disposed between the cylinder 421 and the holding member 43. The piston unit 423 includes a piston 427 that is disposed in the chamber 425, and a piston rod 428 that extends from the piston 427 and out of the cylinder 421 and is connected to the connecting plate 422. By pumping gas into the passages 426, the piston 427 will be moved between the passages 426, thereby controlling movement of the holding member 43. In this embodiment, the actuator 42 is a pneumatic cylinder.

Figure 11:
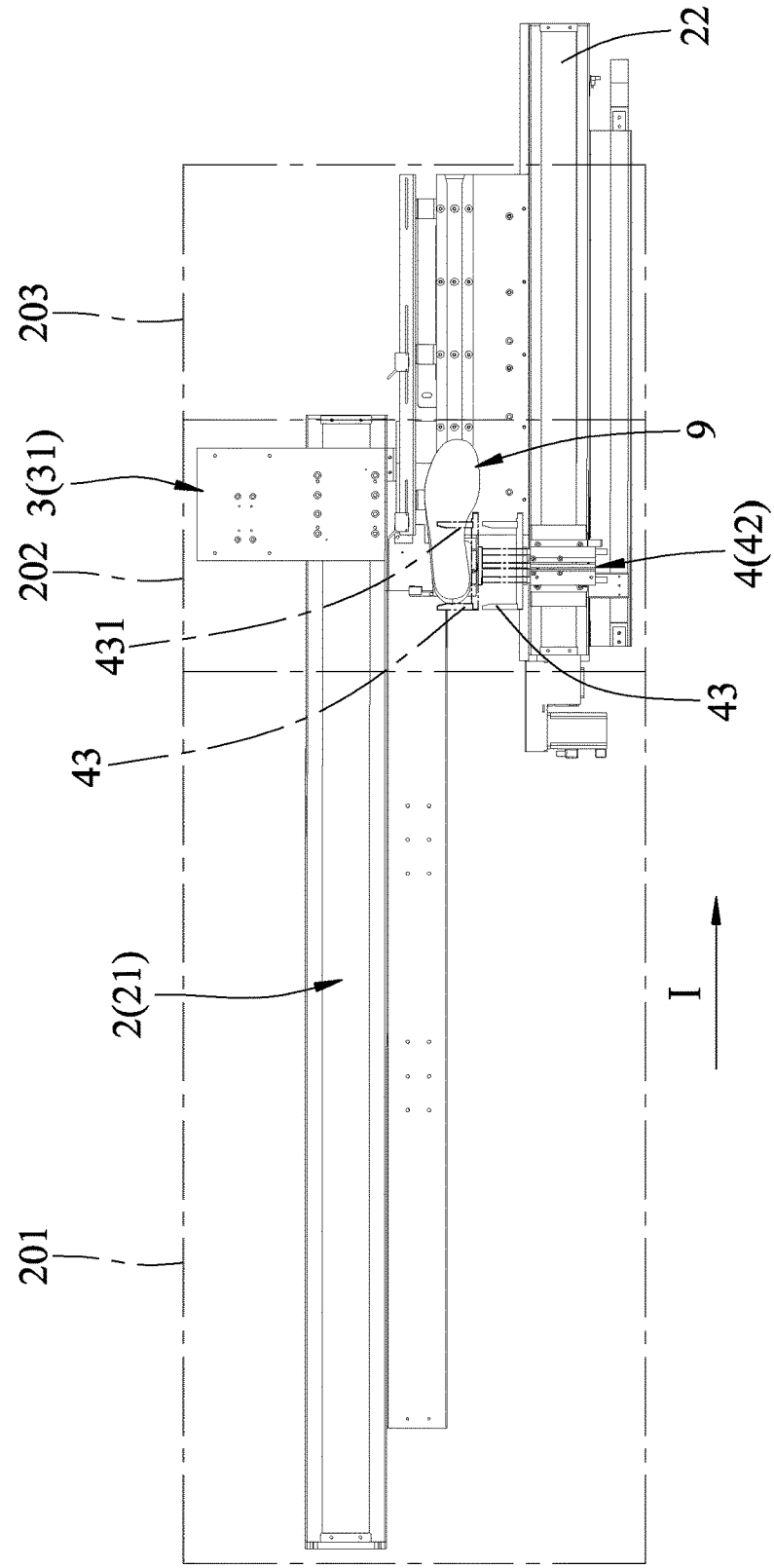
FIG. 11 is a schematic top view of the embodiment, showing the transport device to be in a bridge region of the rail unit and the holding member of the transfer device is operated to hold a shoe last.

Referring to FIGS. 5 and 11, in this embodiment, the process region 201 is configured for processing the shoe vamp on the shoe last 9, such as roughening, adhesive applying, baking, shoe sole attachment, etc., and suitable processing machines (not shown) or robotic arms (not shown) may be utilized for processing. After the shoe vamp is processed, the shoe vamp and the shoe last 9 are moved to the bridge region 202.

Referring to FIGS. 4 and 11, when moving the shoe last 9 from the process region 201 to the bridge region 202, the gripper 32 of the transport device 3 carries the shoe last 9 to the bridge region 202, and the holding member 43 of the transfer device 4 is then activated to engage the shoe last 9 with the holding opening 431 hold the shoe last 9. Afterwards, the gripping claw 34 is opened to release the shoe last 9 from the gripper 32.

Figure 12:
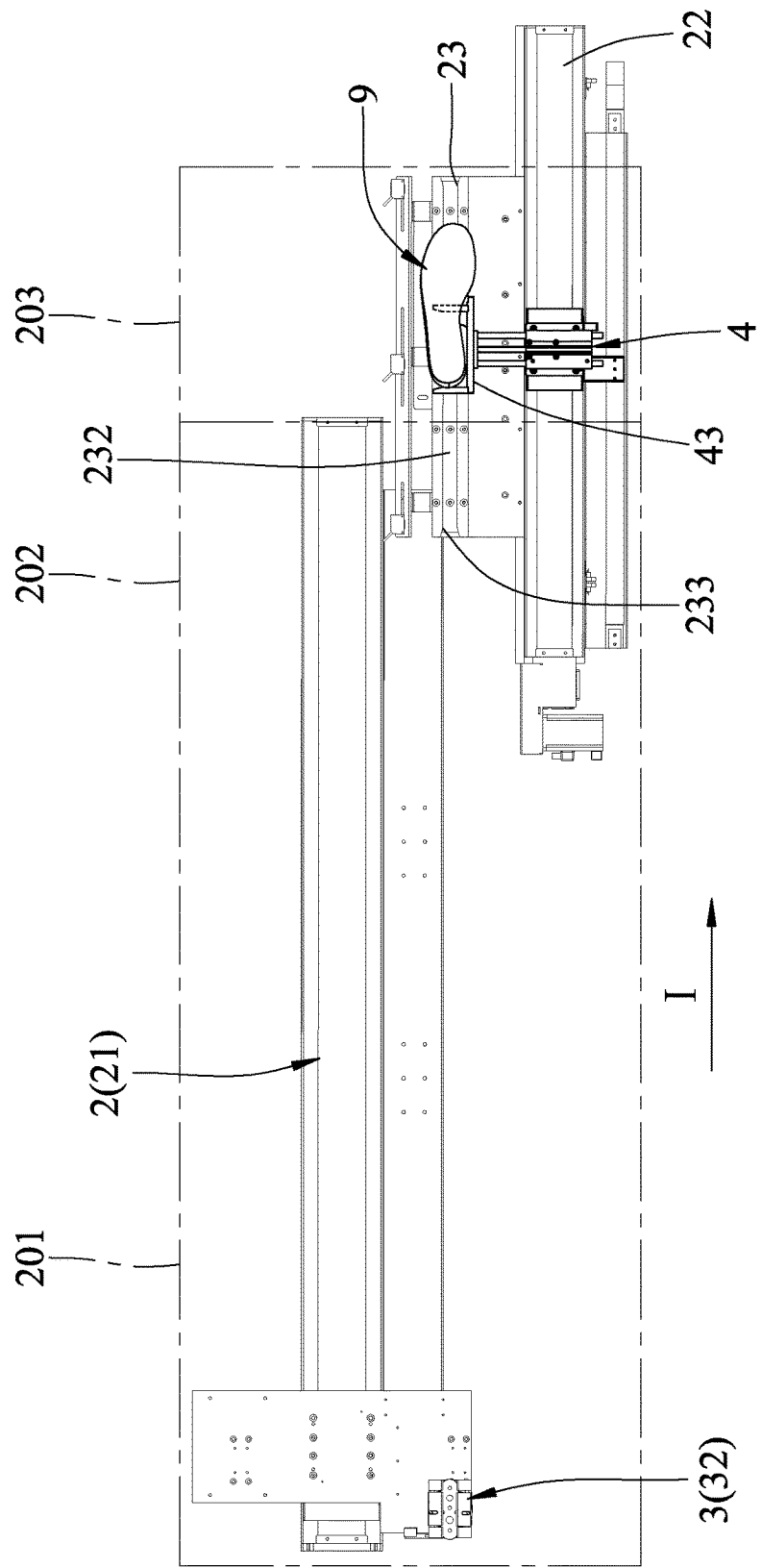
FIG. 12 is a schematic top view of the embodiment, showing the shoe last is conveyed to a transfer region of the rail unit by the transfer device.

Referring to FIGS. 4 and 12, when the holding member 43 is holding the shoe last 9, the second moving seat 222 of the second rail assembly 22 is operated to move from the bridge region 202 to the transfer region 203 along the conveying direction (I). Since the width of each of the diverging groove end portions 233 gradually increases in the direction away from the elongated uniform-width intermediate groove portion 232, one of the diverging groove end portions 233 close to the transfer device 4 can smoothly and effectively guide the shoe last 9 into the elongated uniform-width intermediate groove portion 232, thereby improving the smoothness of transportation of the shoe last 9.

Figure 13:
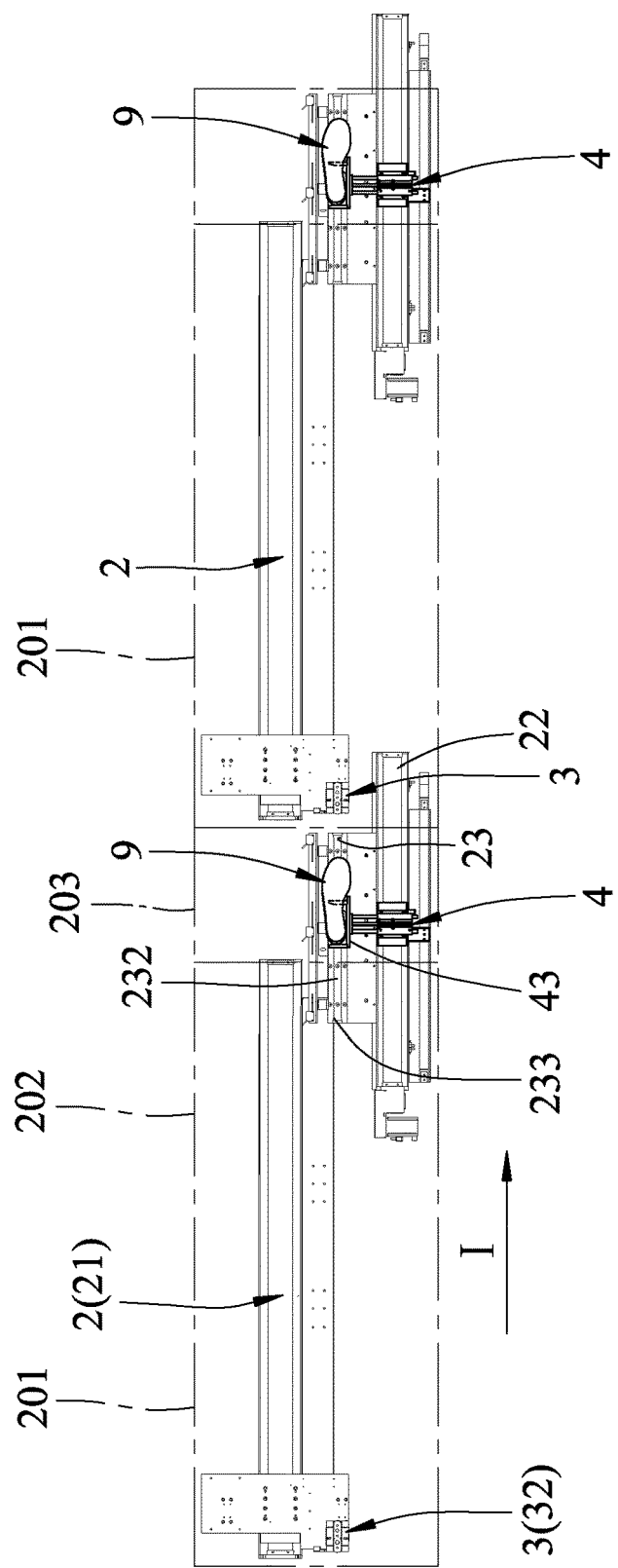
FIG. 13 is a schematic top view showing two of the transport apparatuses of this disclosure being connected together.

It is worth mentioning that multiple transport apparatuses of this disclosure can be connected together along the conveying direction (I) to provide more process regions 201 for accommodating various process steps, such as roughening, adhesive applying, baking, shoe sole attaching, etc. FIG. 13 shows an example which includes two of the transport apparatuses of this disclosure connected together. The rail unit 2, the transport device 3 and the transfer device 4 of each of the transport apparatuses are useful for conveying the shoe last 9 to different regions. Moreover, processing step in the process region 201 of each of the transport apparatuses can be independently performed without the necessity of waiting for other processes, thereby increasing overall process efficiency. It should be noted that the number of the transport apparatuses may be changed according to practical requirements.

While the disclosure has been described in connection with what are considered the exemplary embodiment and variation, it is understood that this disclosure is not limited to the disclosed embodiment and variation but is intended to cover various arrangements included within the spirit and scope of the broadest interpretation so as to encompass all such modifications and equivalent arrangements.

What is claimed is:

1. A transport apparatus adapted to convey a shoe last mounted with a shoe vamp along a conveying direction, said transport apparatus comprising:

a rail unit that is divided into a process region, a bridge region and a transfer region along the conveying direction;

a transport device that is movably mounted to said rail unit and that is movable in said process region and said bridge region, said transport device including a gripper that is adapted for gripping the shoe last; and a transfer device that is movably mounted to said rail unit and that is movable in said bridge region and said transfer region, said transfer device including a holding member that is adapted for holding the shoe last, wherein when said gripper of said transport device is in said bridge region, said holding member of said transfer device is operable to hold the shoe last and transfer the shoe last from said gripper to said transfer region.

2. The transport apparatus as claimed in claim 1, wherein said rail unit includes a first rail assembly that extends from said process region to said bridge region, and a second rail assembly that extends from said bridge region to said transfer region, said transport device being movably mounted to said first rail assembly, said transfer device being movably mounted to said second rail assembly.

3. The transport apparatus as claimed in claim 2, wherein said first rail assembly includes a first rail and a first moving seat that is movable on said first rail along the conveying direction, said transport device further including a carrier seat that is mounted to said first moving seat, said gripper being mounted to said carrier seat.

4. The transport apparatus as claimed in claim 2, wherein said transfer device further includes an actuator that is mounted to said second rail assembly, said actuator being connected to said holding member and being operable to drive said holding member to hold the shoe last.

5. The transport apparatus as claimed in claim 4, wherein:
said holding member of said transfer device has a holding opening that corresponds in shape to the shoe last; and
when said gripper of said transport device is in said bridge region, said actuator is operable to drive said holding member to engage the shoe last within said holding opening of said holding member such that the shoe last is held by said holding member.

6. The transport apparatus as claimed in claim 4, wherein said second rail assembly includes a second rail and a second moving seat that is movable on said second rail along the conveying direction, said transfer device further including a carrier board that is mounted to said second moving seat, said actuator being mounted to said carrier board.

7. The transport apparatus as claimed in claim 1, wherein said rail unit includes a guiding rail that is disposed in said transfer region, said guiding rail having a guiding groove that extends along the conveying direction and that is adapted for the shoe last to slide therethrough.

8. The transport apparatus as claimed in claim 7, wherein said guiding groove has an elongated uniform-width intermediate groove portion, and two diverging groove end portions that are open and that are spatially communicated with said elongated uniform-width intermediate groove portion, each of said diverging groove end portions having a width that gradually increases in a direction away from said elongated uniform-width intermediate groove portion.

9. The transport apparatus as claimed in claim 2, wherein each of said first rail assembly and said second rail assembly is one of rodless pneumatic cylinder, conveyor and linear slide track.

10. The transport apparatus as claimed in claim 1, wherein said gripper includes a gripping claw, and a driving unit that is operable to control said gripping claw to grip or release the shoe last.

* * * * *